Jan. 28, 1958     B. G. OLVING     2,821,267
ANTI-SKID VEHICLE BRAKE SYSTEM
Filed July 8, 1954     3 Sheets-Sheet 1

INVENTOR.
Bror G. Olving

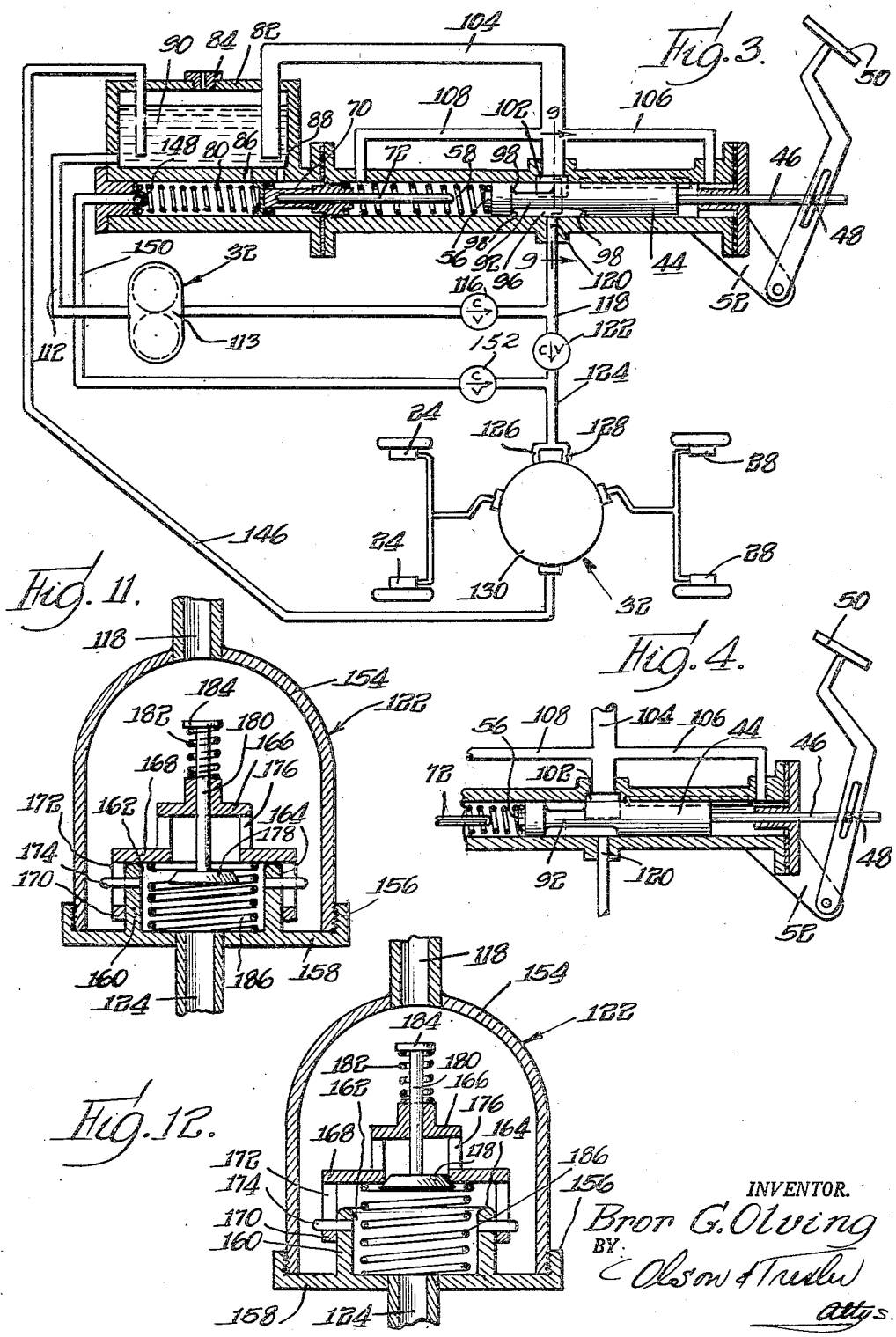

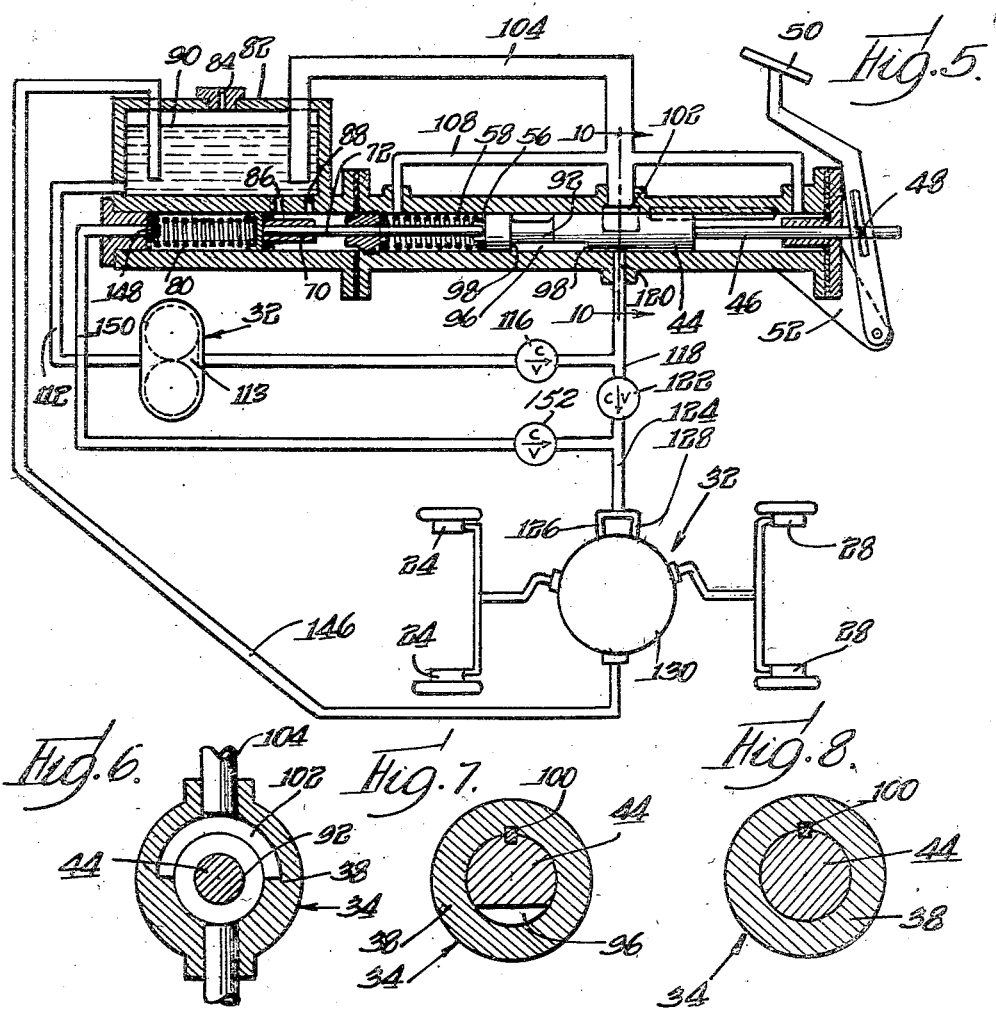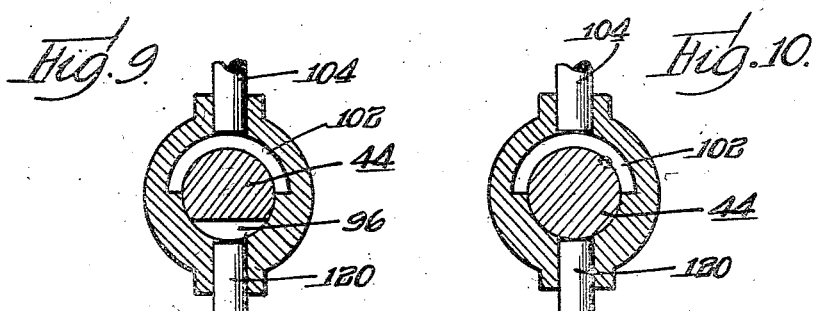

United States Patent Office 2,821,267
Patented Jan. 28, 1958

2,821,267

ANTI-SKID VEHICLE BRAKE SYSTEM

Bror G. Olving, Elgin, Ill.

Application July 8, 1954, Serial No. 442,104

9 Claims. (Cl. 188—85)

This invention is concerned generally with a braking system for vehicles, and more particularly with a safety braking system for automotive vehicles designed to prevent skidding on slippery pavements and the like.

It is well known to the majority of drivers of automotive vehicles that when a road surface is slippery due to wet, icy, or snow covered pavement, or due to other factors including poor tread on the tires of the vehicle, a vehicle has a decided tendency to skid when the brakes are applied and the driver thus frequently tends to lose control of the vehicle, particularly when it is necessary to stop as quickly as possible.

Under normal driving conditions on dry pavement, the friction between the pavement and the treads of the rubber tires commonly used on passenger automobiles and other automotive vehicles is considerable. As a result, a great amount of braking torque can be applied between the brake shoes and the brake drums of the wheels without exceeding the torque exerted by the pavement on the tires. However, when slippery driving conditions are encountered as noted above, the sliding friction between the pavement and the tires is greatly reduced. In fact, it often is reduced to such an extent that any force except the lightest touch on the brake pedal causes the braking torque to overcome the torque imposed on the wheels by the pavement. This results in locking of the wheels, and the vehicle therefore goes into a skid which may not be controllable.

It has long been known to experienced drivers that periodic application and release of the brakes by pumping up and down on the brake pedal prevents the brakes from locking wheels against rotation. A slippery film is formed between ice or the like and a sliding tire, and each time the brakes are wholly or partially released by pumping the brake pedal, a new surface of the tire periphery is brought into contact with the roadway and the slippery film does not have time to form. Accordingly, a much greater braking torque can be applied without causing locking of the wheels and resulting skidding. However, many drivers are not aware of the improved braking results to be obtained in this manner, and yield to the natural tendency to lock the brakes, thus leading to dangerous and often fatal skids. Even drivers who are aware of the benefits derived from braking a vehicle in this manner generally have to act consciously to overcome the natural tendency to lock the brakes, and it is only the most experienced drivers who are capable of pumping the brakes in this manner without concentrated effort.

When the brake pedal is pumped in this manner, all of the brakes of the vehicle act in unison, being on at one time, and off at another time. This may be considered a disadvantage inasmuch as there are times when no brake is acting to slow the vehicle, and following such periods the braking action consists of short, suddenly applied braking forces. It will be apparent that the suddenly applied forces tend more to overcome the friction between the pavement and the tire than would an equal braking force gradually applied.

In my copending application Ser. No. 432,102, filed May 25, 1954, and entitled "Anti-Skid Vehicle Brake System," I have disclosed mechanism for automatically applying the brakes intermittently in accordance with a predetermined pattern or scheme when the brake pedal is depressed. The principles of the invention and a practical mechanism are well disclosed in that application. However, reliance is placed upon engine power for braking, and it is conceivable that the engine might die when the vehicle is moving. It is well known that this frequently happens with automatic transmissions and overdrive inasmuch as the rear wheels can turn without having the motor turn over. Under such conditions there is no power supplied from the motor to apply pressure to the brake fluid. The brake fluid pumped to the brakes in the system disclosed in my aforesaid copending application amounts to several gallons per minute. Therefore, it would not be practical to provide a hydraulic accumulator or pressurized reservoir for operating the brakes if the engine of the vehicle should die.

Accordingly, it is an object of this invention to provide an anti-skid vehicle brake system wherein braking power is supplied automatically to the brakes of a vehicle in accordance with a predetermined scheme or pattern, and the brakes can be manually applied in the event of a power failure.

More specifically, it is an object of this invention to provide a power braking system wherein the brakes can be applied manually by depression of the pedal past its normal braking position in the event of power failure.

Another object of this invention is to provide an improved master brake cylinder construction.

Yet another object of this invention is to provide an improved valve for effecting operation of power brakes with a manual reserve.

Other and further objects and advantages of the present invention will be apparent from the following description when taken in connection with the accompanying drawings wherein:

Fig. 3 is a view similar to Fig. 2 with the brakes partially applied for the automatic safety braking;

Fig. 4 is a fragmentary view similar to a portion of Figs. 2 and 3 with the safety brakes fully applied;

Fig. 5 is a view similar to Figs. 2 and 3 showing the brakes applied manually;

Fig. 6 is a cross sectional view taken substantially along the line 6—6 in Fig. 2;

Fig. 7 is a cross sectional view taken substantially along the line 7—7 in Fig. 2;

Fig. 8 is a view taken substantially along the line 8—8 in Fig. 2;

Fig. 9 is a cross sectional view taken substantially along the line 9—9 in Fig. 3; and Fig. 10 is a cross sectional view taken substantially along the line 10—10 in Fig. 5;

Fig. 11 is a longitudinal sectional view through my improved limit check valve in one position of operation; and Fig. 12 is a view similar to Fig. 11 with the parts in another position of operation.

Figure 1:
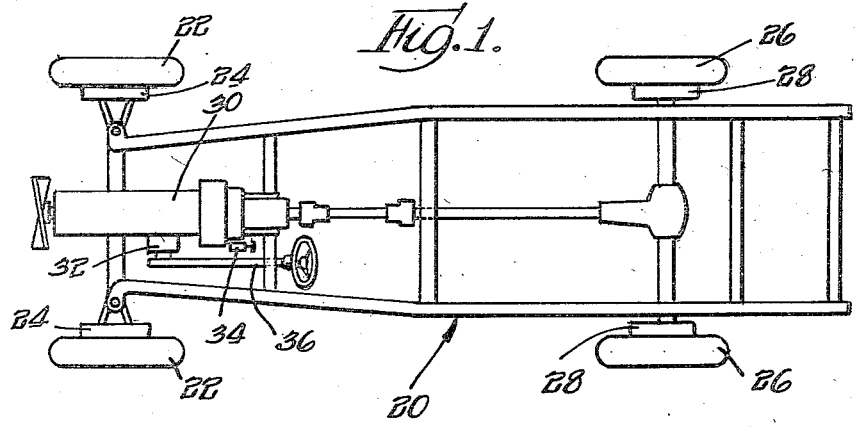
Fig. 1 is a simplified top view of an automobile chassis and engine to which the principles of my invention may be applied.

Referring first to Fig. 1, there is shown a chassis 20 of an automobile or other vehicle with which my invention might be used. The vehicle includes a pair of front wheels 22 having hydraulic brakes 24, and a pair of rear wheels 26 having hydraulic brakes 28. The hydraulic brakes 24 and 28 are of conventional construction, and accordingly only the brake housings are shown in Fig. 1. The chassis is provided with an engine 30 having a power unit 32 on the side thereof and driven by the engine. A brake actuating unit 34 is mounted adjacent the transmission, and the chassis is provided with the usual steering column and wheel 36.

Figure 2:
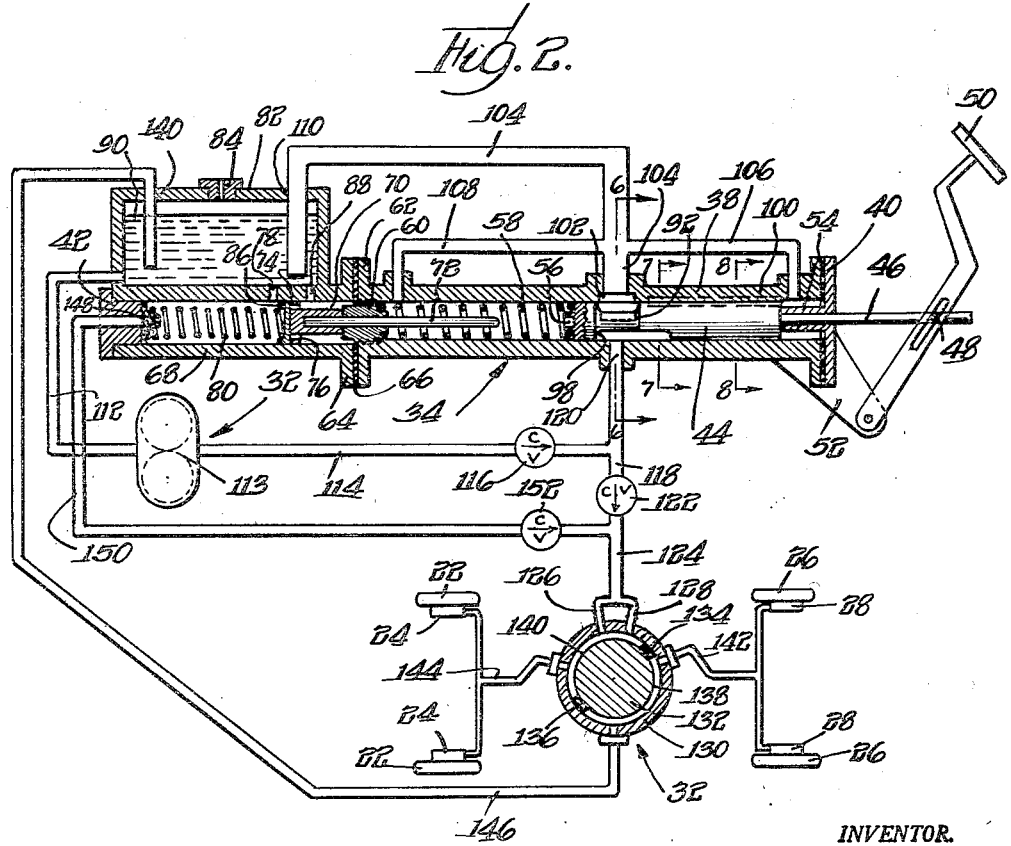
Fig. 2 shows my improved master brake cylinder and the hydraulic circuit associated therewith.

Reference next should be had to Fig. 2 wherein the brake actuating unit 34, the power unit 32, and the interconnecting hydraulic system are fully disclosed. The brake unit comprises a power actuating cylinder 38 provided with an end cap 40 on the right hand end (as viewed in Fig. 2), and with an end cap 42 at the other end. A slide valve or piston 44 is fitted in the right hand portion of the actuating cylinder 38 and is slidable therein. A piston rod 46 projects through the end piece 40 and is connected by means of a pin-in-slot connection 48 with the brake pedal 50, the pedal being pivotally mounted on a bracket 52 depending from the master cylinder 34. A tubular sleeve 54 projects into the cylinder 38 from the end piece 40 encircling the piston rod 46, and forms a limit stop for the piston or slide valve 44.

The left hand end of the piston is provided with a hollow boss 56, and a spring 58 is seated about this boss and is trapped against a plug 60 threaded into the end of the left hand portion of the brake master cylinder 34. The spring normally is sufficiently compressed to hold the piston or slide valve 44 in its retracted position to the right as shown in Fig. 2.

The left hand portion of the master cylinder structure 34 is provided with a circumferential flange 62, and a complementary flange 64 is held against the same by suitable means such as bolts (not shown), a gasket 66 being clamped between the flanges. The flange 64 is formed integral with a brake reserve cylinder 68 having a piston 70 therein mounted on a rod 72 projecting back through the plug 60 into the right hand portion of the brake cylinder and in alignment with the hollow central portion of the boss 56. The piston 70 is provided with a circumferential flange 74 having circumferentially disposed axial openings 76 therein. A flexible piston cup 86 is secured to the left end of the piston 70 including the flange 74. A spring 80 is compressed between the piston 70 and the plug or closure member 42 threaded into the left end of the reserve brake cylinder 68. A reservoir 82 is formed integral with the reserve brake cylinder 68, and is provided with a vented filler cap 84. A valve port 78 is provided from the reservoir into the reserve cylinder in front of the piston 70, and a relief port 88 is provided behind the enlarged flange 74 of the piston. Hydraulic fluid 90 is maintained at a predetermined level in the reservoir 82 as will be apparent.

The piston or slide valve 44 is provided with a neck or portion 92 of reduced diameter generally toward the left end thereof as viewed in Fig. 2, and as also may be seen in Fig. 6. This neck 92 is of limited extent along the top and sides of the piston 44, being filleted to the outer surface of the piston at 98. On the bottom of the piston the neck is elongated as indicated at 96, (Figs. 3 and 7), also along the bottom being filleted to the outside of the piston as indicated at 98. The piston 44 is retained in an upright, non-rotating position by a key 100 as may be seen in Figs. 2, 7 and 8. This key and the keyways in which it fits are of sufficient extent relative to one another that the piston can slide longitudinally in the cylinder 38, although it cannot rotate therein.

There is provided on the inside of the cylinder 38 adjacent the normal or rest position of the reduced neck 92 a semi-circular groove 102 as may be seen in Figs. 2 and 6. This semi-circular groove communicates at the top portion of the cylinder 38 with a large hydraulic return conduit 104.

A branch conduit 106 leads from the return line or conduit 104 to the right end of the cylinder 38 opening therein behind the piston or slide valve 44. Similarly, a branch line 108 leads from the return line or conduit 104 to the left end of the cylinder 38 and in front of the piston or slide valve 44. Thus, the piston is free to slide in either direction without being impeded by hydraulic pressure. Any hydraulic fluid that might leak into either end of the cylinder would simply pass into the return line 104, and it will be noted that the cylinder generally will be filled with hydraulic fluid at either end of the piston due to the open lines 106 and 108. The return line 104 enters the reservoir 82 at 110 for returning hydraulic fluid thereto.

A hydraulic line or conduit 112 leads from the reservoir 82 to the pump 113. This pump is driven from the engine 30 as previously indicated, such as by a gear on the cam shaft meshing with a suitable gear on the drive shaft of the pump. The pump 113 is preferably a gear pump capable of pumping at least two gallons per minute at high pressure. The pump discharges hydraulic fluid under pressure into a hydraulic line 114 leading through a check valve 116 to a hydraulic line 118. The hydraulic line 118 leads up to the cylinder 38 and enters the cylinder at 120 diametrically opposite to the return line 104. The line 118 also leads down to a limit check valve 122. It will be seen that fluid pumped through the line 114 from the pump 113, and through the check valve 116 to the line 118 can pass around the neck 92 of the piston or slide valve 44 for circulation into the return line 104 and back to the reservoir. The pressure on the fluid when so circulated, due to friction and other impeding factors, will be substantially less than one-hundred pounds per square inch and as the two-way limit valve 122 will close at a very minute hydraulic pressure, the fluid is stopped from reaching the brakes as will be apparent hereinafter.

The two-way limit check valve 122 leads to a high pressure hydraulic line 124 which is bifurcated at its end as indicated at 126 and 128, the bifurcations leading to the interior of a cylindrical distributor 130. This hydraulic distributor 130 is provided with a center rotor 132 having a pair of vanes 134 and 136 thereon. The vanes fit tightly, but movably, against the inner surface of the distributor casing and divide the space between the distributor casing and the rotor 132 into two flow passageways 138 and 140. A rear hydraulic brake line 142 leads from the hydraulic distributor 130 to the rear brakes 28, while a front hydraulic brake line 144 leads from the hydraulic distributor to the front brakes 24. Diametrically opposite to the mean of the bifurcated lines 126, 128 there is provided a return line 146 running back to the hydraulic reservoir and entering the reservoir at 140.

The operation of the hydraulic distributor 130 is fully explained in my aforementioned copending application Ser. No. 432,102, filed May 25, 1954, and entitled "Anti-Skid Vehicle Brake System." Suffice it to say here that the rotor is driven from the engine at a reduced speed, and may be driven along with the pump through a gear reducer from the pump drive shaft, being part of the power unit 32.

The reserve brake cylinder 68 is provided with a back check valve as indicated at 148 leading to a high pressure line 150. This line passes through a one way back check valve 152 and joins the high pressure line 124 below the two-way limit check valve 122.

The internal construction of the two-way limit check valve 122 may be seen in Figs. 11 and 12. The two-way limit check valve includes a bell-shaped valve enclosure 154 threaded at its lower end into an upstanding flange 156 on a flat valve base 158. The valve base is provided with an upstanding cylindrical wall 160 defining a chamber 162. The upper end of the annular wall is machined to form a valve seat 164. A valve body 166 having a flat valve closure bottom 168 is arranged to seat on this valve seat 164. The flat bottom 168 is positioned by means of an annular skirt 170 encircling the cylindrical wall 160. The annular skirt is provided with a number of vertically elongated slots 172, and pins 174 extend substantially radially outwardly from the wall 160 through these slots to limit the upward movement of the valve closure bottom 168.

The valve body 166 is provided with lateral ports 176, and a valve disc 178 is arranged to seat against an opening in the flat bottom 168 to prevent fluid flow through these ports. The valve disc 178 is provided with a stem 180 upstanding through the valve body 166 and urged upwardly by a coil spring 182 encircling the stem and compressed between a cap 184 on the stem and the top of the valve body 166. A coil spring 186 is positioned within the chamber 162 and normally urges the valve body 166 upwardly to the position shown in Fig. 12.

Under normal or idling conditions of operation when pump 32 is running and control piston 44 is in the normal or inactive position (Fig. 2) and hydraulic brake fluid keeps circulating from pump to reservoir, low-pressure valve 168 (Fig. 11) is closed due to the slight idling pressure in the pump system and the high pressure valve 178 remains closed as the idling pressure is not high enough to open said valve (as a minimum of 100 p. s. i. is required to open said high pressure valve).

When brake pedal 50 is actuated, the hydraulic pressure in the line 118 increases and as said pressure exceeds 100 p. s. i., high pressure valve 178 opens against the force of the spring 182 (as shown in Fig. 11) for passing hydraulic fluid under pressure into the brake line 124 to effect stopping of the vehicle.

If the hydraulic pump 32 is stalled and the manual emergency brake system has been actuated, high pressure hydraulic fluid in brake fluid distributor cannot return to the reservoir 82 through the regular pipe line 146, but will escape to the reservoir through the low pressure valve 168 (Fig. 12) as soon as the valve piston 44 returns to its normal position at the end of the braking period.

*Operation*

Under normal conditions of operation the power unit including the pump 113 and the hydraulic distributor 130 are rotated by the engine 30 of the vehicle. Hydraulic fluid is pumped from the reservoir 82 through the conduit 112, the pump 113, the conduit 114, the back check valve 116, the conduit 118, and inlet 120, around the neck 92 of the piston or slide valve 44, through the semi-circular groove or recess 102 and thence into the return line 104. When the brake pedal 50 is depressed to stop the vehicle, the piston 44 is moved part way to the left as shown in Fig. 3. The filleted end 98 at the right hand end of the neck 92 closes off a part of the annular or semi-circular groove or recess 102, thereby causing a resistance to flow of hydraulic fluid and building up pressure in the line 118. Accordingly, the high-pressure valve 178 of the two-way check limit valve opens as shown in Fig. 11. High-pressure hydraulic fluid is delivered through the line 124 and the bifurcations 126 and 128 to the space 138, 140 (Fig. 2) within the distributor casing. The rotor 132 normally is rotating and the vanes 134 and 136 thus alternately arrange the spaces 138 and 140 to connect the bifurcations 126 and 128 alternately through the front brake line 144 to the front brakes 24 and through the rear brake line 142 to the rear brakes 28. Alternatively, the brake lines are connected through the flow passageways 138 and 140 to the return line 146. As shown in Fig. 2 the brakes are applied to the wheels while the rear brakes are released through the return line 146.

The brakes are partially applied by depressing the pedal to a position approximating that in Fig. 3. For full application of the brakes the pedal is depressed to the position shown in Fig. 4. In this position the top portion of the piston 44 completely seals off the semi-circular groove or recess 102, and the return path of the hydraulic fluid is blocked. Thus, the full pressure which the pump 113 is capable of delivering is impressed upon the hydraulic distributor 130, and through it to the brakes 24 and 28 in predetermined timed relation in accordance with a predetermined sequence or pattern.

In the event that the motor 30 should fail the pump 113 would cease to operate. Simultaneously, the rotor 132 of the hydraulic distributor would stall. However, the rotor would be in such a position that at least either the front brakes or the rear brakes would be applied. If one of the vanes 134, 136 should stop between the bifurcations 126 and 128 with the other vane sealing the outlet to the return line 146, then both the front brakes and rear brakes would be connected to the hydraulic line 124. In such an event, the brake pedal 50 is depressed past its normal position. Such depression as shown in Fig. 5 brings the hollow boss 56 on the end of the piston or slide valve 44 into engagement with the end of the rod 72 to force the reserve piston 70 to the left. When the reserve piston passes the port 86, it applies pressure to hydraulic fluid in the reserve cylinder 68 as is the case with conventional hydraulic brakes. Thus, the pressure is applied to the line 150, and through the back check valve 152 to the high-pressure line 124, and through the distributor to the brakes of either the front or rear wheels or both, as explained above. The slide valve or piston 44 completely closes off the return line 104 and no pressure is lost through the line 118. When the brake pedal 50 is released, the parts return to the position shown in Fig. 2 and the pressure, built up within the line 124, acts with the spring 186 to open the low pressure valve of the limit check valve 122 as shown in Fig. 12 and pressure is released from the brakes through the line 124, the two-way limit check valve 122, the line 118 and inlet 120, around the neck 92 and through the semi-circular groove or recess 102, and finally through the return line 104 to the reservoir 82. Thus, it will be seen that the operational features of the two-way limit check valve 122 are necessary for proper operation of the system.

The ability of my braking system to achieve braking force proportional to the degree of depression of the brake pedal 50 renders operation quite similar to that of ordinary hydraulic brakes insofar as the reaction to the operator is concerned. The filleting at 98 around the neck 92, and the elongated recess 96 cooperate in achieving this effect by allowing the flow passages to be cut off gradually. Obviously, the filleting could be modified to produce a braking effect working on a logarithmic scale or on a square scale, or on any other scale if it were so desired.

Broadly, I have presented a power braking system having a reserve or emergency brake in addition thereto. More specifically, the power braking system is a safety system preventing skids on slippery pavement or for other reasons, with the safety braking system backed up by reserve brakes operable upon depression of the brake pedal past its normal position. Obviously, any suitable spring or biasing means, or locking means which would be overcome by a predetermined pressure would be utilized to limit the normal position of depression of the pedal 50, with subsequent depression beyond this point being effected by a stronger than normal push to bring the reserve brakes into operation. The brake system is simple in construction, and hence economical to produce, and is proof against failure.

The specific example of my invention herein shown and described will be understood as being for illustrative purposes only. Various changes in structure will doubtless occur to those skilled in the art and are to be understood as forming a part of my invention insofar as they fall within the spirit and scope of the appended claims.

I claim:

1. A safety braking system for a vehicle having hydraulic brake means comprising a reservoir for hydraulic fluid, means for returning hydraulic fluid from said brake means to said reservoir, a pump, power means for driving said pump, a hydraulic line from said reservoir to said pump, a pressure line leading from said pump, a valve cylinder, an inlet connection to said valve cylinder from said pressure line, hydraulic pressure conveying means connecting said pressure line to said hydraulic brake means, a hydraulic return line to said reservoir connected to said valve cylinder and substantially opposite to the inlet connection, a piston slidable in said cylinder and having a reduced neck portion capable of being positioned intermediate said inlet connection and said return line, means including a brake pedal for axially moving said piston to cause said reduced neck portion to by-pass hydraulic fluid from said pressure line to said return line or to block said return line for applying fluid under pressure to said hydraulic pressure conveying means for operating said brake means, a reserve cylinder aligned with said valve cylinder and in communication with said reservoir, a reserve piston in said reserve cylinder, means projecting from said reserve piston into position for engagement by said first mentioned piston upon movement past a predetermined position to cause said reserve piston to exert pressure on hydraulic fluid in said reserve cylinder, a hydraulic conduit from said reserve cylinder to said hydraulic pressure conveying means for applying pressure hydraulically to said brake means independently of said pump, means in said pressure line preventing backflow of hydraulic fluid into said pressure line from said hydraulic conduit, and means in said hydraulic conduit preventing backflow of hydraulic fluid from said pressure line into said hydraulic conduit.

2. A safety braking system as set forth in claim 1 wherein the backflow preventing means in the pressure line comprises a valve having two valve closure members and associated flow passages, one of the flow passages normally being closed by its associated valve closure member and the other of said valve passages normally being open, the second valve closure member closing off its associated valve passages upon application of a predetermined amount of pressure to fluid in said pressure line, and the first valve closure member being movable to open its associated valve passage upon application of pressure beyond another predetermined limit to pressure fluid in said hydraulic line.

3. A safety braking system as set forth in claim 1 wherein the brake means comprises a plurality of hydraulic brakes, and further including a distributor in said hydraulic pressure conveying means between said pressure line and said brakes, said returning means including a return line from said distributor to said reservoir, said distributor sequentially connecting said brakes to said pressure line and to said return line whereby the brakes are actuated in sequence.

4. A safety braking system for a vehicle having hydraulic brake means comprising a reservoir for hydraulic fluid, means for returning hydraulic fluid from said brake means to said reservoir, a pump, power means for driving said pump, a hydraulic line from said reservoir to said pump, a pressure line leading from said pump, a valve cylinder, an inlet connection to said valve cylinder from said pressure line, hydraulic pressure conveying means connecting said pressure line to said hydraulic brake means, a hydraulic return line to said reservoir connected to said valve cylinder and substantially opposite to the inlet connection, a piston slidable in said cylinder and having a reduced-neck portion capable of being positioned intermediate said inlet connection and said return line, means including a manually operable brake member for axially moving said piston to cause said reduced-neck portion to bypass hydraulic fluid from said pressure line to said return line or to block said return line for applying fluid under pressure to said hydraulic pressure conveying means for operating said brake means, a reserve cylinder adjacent said valve cylinder and in communication with said reservoir, a reserve piston in said reserve cylinder, means interconnecting said reserve piston and said first-mentioned piston with a lost-motion connection whereby said first-mentioned piston upon movement past a predetermined position effects movement of said reserve piston to exert pressure on hydraulic fluid in said reserve cylinder, a hydraulic conduit from said reserve cylinder to said hydraulic pressure conveying means for applying pressure hydraulically to said brake means independently of said pump, means in said pressure line preventing backflow of hydraulic fluid into said pressure line from said hydraulic conduit, and means in said hydraulic conduit preventing backflow of hydraulic fluid from said pressure line into said hydraulic conduit.

5. A safety braking system as set forth in claim 4 wherein the reserve cylinder is aligned with the valve cylinder.

6. A safety braking system as set forth in claim 5 wherein the interconnecting means with the lost-motion connection includes an elongated member disposed between the two pistons and initially spaced from at least one of said pistons, said elongated member being axially movable by the first-mentioned piston.

7. A safety braking system for a vehicle having hydraulic brake means comprising a reservoir for hydraulic fluid, a pump, a hydraulic line connecting said reservoir to said pump, power means for driving said pump, a pressure line connected to said pump for receiving hydraulic fluid under pressure, a valve cylinder, means connecting said pressure line to said valve cylinder and to said brake means, a piston in said valve cylinder having hydraulic passage means for selectively applying hydraulic fluid under pressure from said pressure line to said brake means, means including a manually operable brake member for selectively operating said piston, a reserve cylinder aligned with said valve cylinder and in communication with said reservoir, a reserve piston in said reserve cylinder, means projecting from one of said pistons into position for engagement with the other of said pistons upon movement of the first-mentioned piston past a predetermined position to cause said reserve piston to exert pressure on hydraulic fluid in said reserve cylinder, means including hydraulic conduit means interconnecting said reserve cylinder and said brake means for applying hydraulic pressure to said brake means independently of said pump, means in said interconnecting means preventing backflow of hydraulic fluid from said pressure line, means associated with said pressure line and the connecting means therefor to prevent backflow of hydraulic fluid from said reserve cylinder, means for returning hydraulic fluid from said brake means to said reservoir.

8. A safety braking system as set forth in claim 7 and further including a distributor in the pressure line connecting means and connected to said returning means, said distributor being operable sequentially to connect said brake means to said pressure line and to said returning means whereby to operate said brakes sequentially.

9. A safety braking system for a vehicle having a front and rear brake means, including a power source of braking power, distributor means having separate connections with said front and rear brake means, manually operable means for supplying braking power from said source to said distributor means, reserve means for applying manual braking power to said distributor means upon movement of the braking power supplying means past a predetermined position, said distributor means including control means for sequentially controlling said separate connections to effect alternate application and release of the front and rear brake means with interim, substantially simultaneous application of both front and rear brake means, and means for operating said distributor means to apply braking power from the distributor means through said connections to the brake means in accordance with the movement of said control means relative to the separate connections in the sequential control of said connections.

References Cited in the file of this patent

UNITED STATES PATENTS

| | | |
|---|---|---|
| 1,115,582 | Sauer | Nov. 3, 1914 |
| 1,662,096 | Zelov | Mar. 13, 1928 |
| 2,466,837 | Bohr | Apr. 12, 1949 |
| 2,583,169 | Funkhouser | Jan. 22, 1952 |
| 2,687,189 | Schnell | Aug. 24, 1954 |

FOREIGN PATENTS

| | | |
|---|---|---|
| 676,680 | Great Britain | July 30, 1952 |
| 1,074,857 | France | Apr. 7, 1954 |